Dec. 22, 1953 R. E. PIKE Re. 23,757

COMPLEMENTARY COLOR BLENDING

Original Filed Sept. 30, 1948

INVENTOR.
Ralph E. Pike
BY
Frank C. Hilberg
ATTORNEY.

Reissued Dec. 22, 1953 Re. 23,757

UNITED STATES PATENT OFFICE 23,757

COMPLEMENTARY COLOR BLENDING

Ralph E. Pike, Flint, Mich., assignor to E. I. du Pont de Nemours & Company, Wilmington, Del., a corporation of Delaware Original No. 2,642,404, dated June 16, 1953, Serial No. 247,957, September 24, 1951, which is a division of Serial No. 51,883, September 30, 1948, now Patent No. 2,604,414, dated July 22, 1952. Application for reissue September 30, 1953, Serial No. 383,428

17 Claims. (Cl. 260—16)

Figure 1:
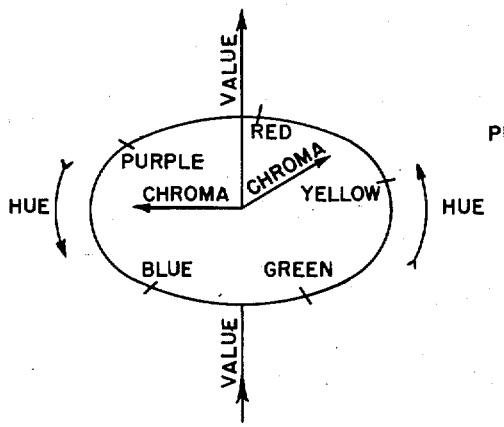

Matter enclosed in heavy brackets [ ] appears in the original patent but forms no part of this reissue specification; matter printed in italics indicates the additions made by reissue.

This invention relates to lacquers and synthetic enamels and particularly to such coating compositions which possess a translucent metallic appearance and which are currently popular for automobile finishing.

A customary requirement for coating compositions is opacity in relatively thin films, a property commonly referred to as hiding power. Although desirable in some of its aspects, this opacity limits the appearance of a film of coating composition to the colors reflected from its surface. In the past few years, coating compositions which have a transparent appearance and relatively low hiding power, but which possess a desirable "depth," luster, and metallic appearance, have been very popular, particularly as automobile finishes. In this case depth does not involve intensity as in the term "deep color". Rather, it means the optical illusion of distance or thickness characteristic of metallic finishes. The metallic appearance is difficult to describe, but it might be regarded as the optical sensation resulting from the multicolor effect produced by a somewhat translucent coating composition partly by the light reflected from the surface, and partly by the light transmitted by the translucent film and ultimately reflected by aluminum flakes in the film.

A coating composition described as being metallic in appearance possesses the following characteristics, to some degree, simultaneously: (1) An appearance of depth or distance in the film, (2) An ability to change color depending on the nature and direction of the illuminating source, (3) The ability to high light, or attract attention, to changes in contour of the finished article (for instance, body design of automobiles), and (4) a multi-color or polychromatic effect on flat surfaces. Thus, it is common in the coating composition industry to refer to overall metallic effect rather than to attempt to identify the specific quality that is present or absent. Since no composition is known which possesses a maximum of all four characteristics, useful coating compositions are selected on the basis of the most favorable combination of those characteristics.

In the description of this invention the terms for the qualities of color will be based upon the definitions given in the Munsell Book of Color by A. H. Munsell. "Hue" is the name of a color, as red or green—the first characteristic that the eye detects. "Value" is the amount of light in a color; how light or dark it is, or how nearly white or black it is. "Chroma" is the strength of the color; how strong (intense) or weak (gray) it is.

By the term "complementary pigment" and related expressions, as used herein, is meant a pigment or group of pigments which will substantially neutralize the color of the prime pigment to a true gray or to a grayish base of the same hue as that that desired in the final color.

U. S. Patents 2,140,745; 2,335,760; and 2,384,579 describe means of accomplishing some degree of transparency in nitrocellulose lacquer and synthetic enamel compositions. Essentially these methods retain the principal pigment in a state of very fine division so that its transparent properties may be utilized, in conjunction with aluminum flakes, to produce the above-mentioned desirable metallic appearance. U. S. Patent 2,140,745 covers the process of "flushing" pigments from the wet pulp stage directly into uniform dispersion in lacquers without the intermediate steps of drying and pulverizing the pigment. While applicable to some degree with all pigments, the process is most useful with those ordinarily manufactured by chemical precipitation from water solution. U. S. Patents 2,335,760 and 2,384,579 prepare iron oxide pigments capable of being flushed into lacquer or enamel vehicles so that the very small primary particles of the pigment do not agglomerate to any marked extent and so that the nature of the particles is not substantially changed from their freshly-precipitated condition. Thus, durable, lightfast and relatively inexpensive pigments of comparatively high transparency and low hiding power are made available for use as the principal, or so-called prime pigment in lacquers and synthetic enamels for outdoor exposure. In low concentrations these colloidal hydrated or hydrous ferric oxides impart an amber tinge to the film-forming component of the coating compositions. In higher concentrations, the color is a translucent gold, brown, or reddish brown. In the actual use of the iron oxides, it has been necessary and desirable to add to the iron oxide base composition closely controlled amounts of selected relatively opaque tinting or toning pigments, suitably dispersed in a useful vehicle, to impart opacity or hiding power, at the same time coloring the composition to the desired hue. Small quantities of selected flaked aluminum pigment added to this mixture increase the "value" or lightness of the color and provide the metallic appearance. However, when these hydrous iron oxide bases are shaded by orthodox methods using conventional pigments—black, white, maroon, blue, green and yellow—either of two things occurs: (1) So little shading pigment is used that the hiding power is insufficient or an amber or brownish tone from the hydrous iron oxide is visible, limiting the color range of finished compositions to browns and olive greens. (2) So much shading pigment is used that the excellent outdoor durability of the hydrous iron oxide in the coating composition is overcome by the comparatively poor outdoor durability of the shading pigments, which in most cases are notably inferior to hydrous iron oxide in color-fastness, chalk-resistance, and general resistance to film deterioration. For instance, excessive amounts of phthalocyanine blue and green pigments, while providing satisfactory light stability, produce a dull red chalk or bronze under normal exposure conditions. Excessive amounts of aluminum flake cause dulling and aluminum chalking. Carbon black and lamp black pigments, of the low tinting strength type required to maintain low aluminum concentration, show early dulling and chalking on exposure.

In order to obtain maximum freedom from aluminum mottling or flooding (heterogeneous pigment pattern in the applied film) in practical metallic enamel formulations, a minimum concentration of aluminum in the enamel is essential. Unfortunately, brightness and lightness increase with aluminum content, and the bright colors are currently the most popular ones for articles commonly finished with "metallic" colors. These bright colors can be made by any of the following methods.

A. Use of high aluminum concentration resulting in severe flooding or mottling tendencies and early dulling on exposure.

B. Use of a combination of aluminum and non-chalking opaque white pigments, which invariably results in a sacrifice in metallic appearance over alternate A.

C. Use of a maximum of low tinting strength, transparent type pigment and a minimum of strong toning pigments, by the complementary blending principles as described in this invention.

It has been desirable to prepare enamels and lacquers with a greater variety of hues, improved metallic appearance, and improved outdoor durability, using the iron oxides of U. S. Patents 2,335,760 and 2,384,579. It has also been desirable to accomplish essentially the same results by finding and using, as additives to or substitutes for the hydrous iron oxides, prime pigments which possess the desirable properties of transparency, low tinting strength, and good durability, capable of being tinted to the desired hue with relatively minor quantities of lightfast toning pigments that are strong (high in chroma), relatively opaque, high in tinting strength, and that preferably but not necessarily possess good durability in enamel films.

Accordingly ,the purpose of this invention is to provide improved synthetic enamels and lacquers which are durable, lustrous, translucent and metallic in appearance. A further object is to make new durable, relatively inexpensive colored coating compositions, suitable for finishing automobile exteriors, which possess metallic effect to an unusual degree. Another object is to make durable gray lacquers or enamels without the use of black or white pigments. Still another object is to make a pigmented composition of a specific hue using a pigment of that hue or an equivalent blend of more than one pigment in only minor portions with respect to the total pigment present. An additional object of this invention is to provide a method of using the desirable properties of hydrated iron oxide pigments in enamels and lacquers possessing better durability and a wider variety of hues than heretofore available. Other objects will appear as the invention is described.

There are no known pigments which individually impart all the desired properties discussed above to a synthetic resin metallic enamel, but by selecting pigments according to the new procedure of the present invention, pigments which otherwise are undesirable can be combined to produce brilliant, durable beautiful metallic finishes which are substantially non-chalking, and non-fading.

The objects of this invention are accomplished fundamentally by using the hydrous iron oxide pigments described in U. S. Patents 2,335,760 and 2,384,579 in combination with one *transparent* pigment, or a blend of two *transparent* pigments, relatively complementary to the iron pigment so that the yellow nature of the latter is substantially neutralized to a true gray or to a grayish base of the same hue as that desired in the final color. Then a tinting pigment of that hue, but of higher chroma, or an equivalent blend of two or more pigments, is added to adjust the color of the product to the desired strength, or chroma. A preferred modification is to select the "neutralizing" pigment (or pigments) in such a way that it (or one of them) can be used in excess of the required "neutralizing" quantity to produce the desired color. This method reduces the number of pigments required and simplifies the application of this invention to commercial enamel manufacture. Finally, the value or lightness is adjusted by adding flaked aluminum pigment. The resulting composition possesses simultaneously the desired hue, chroma, and value along with the most favorable combination of the four characteristics of a metallic enamel; depth, apparent color change, high lighting, and polychromatic effect. While the above description is based on hydrous iron oxide pigments, the same principle is applicable to other prime pigment bases, as will be explained later.

Figure 2:
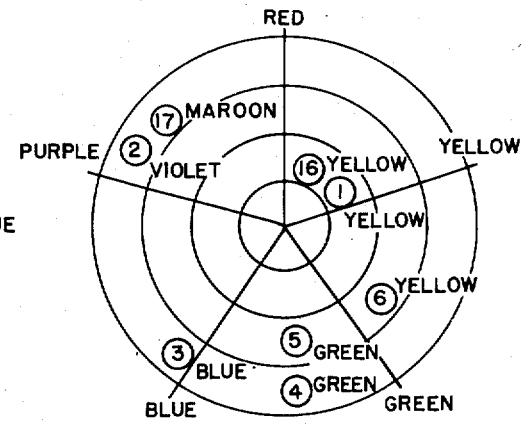

In the attached drawing, Figure 1 shows the three dimensional diagrammatical concept of color characteristics. The vertical axis is value (from black to white), the horizontal axis is chroma (from neutral gray at the center to stronger color away from the center) and the radial or angular location on any given value plane is hue. Figure 2 is a vertical view of the same system, a two dimensional view showing only hue and chroma, the qualities most important in this invention. The numbered positions on Figure 2 show the approximate hue and chroma of the eight pertinent pigments.

It is to be understood that throughout the examples, the pigments are in the form of mill bases prepared by dispersing the pigment in a suitable vehicle by grinding in a ball-, roller-, pebble-, or buhrstone-mill, by other suitable dispersing methods, or in some cases by the processes of U. S. Patents 2,140,745 and 2,384,579.

TABLE 1

Pigment key

| Pigment | Description |
|---|---|
| (1) | Hydrous Iron Oxide (Note 1) (U. S. P. 2,384,579). |
| (2) | Lake of Dichloro-isodibenzanthrone on Barium Rosinate. |
| (3) | Phthalocyanine Blue. |
| (4) | Phthalocyanine Green. |
| (5) | Chromium Tetrahydroxide (Guignet's Green). |
| (6) | Lightfast Nickel Azo Salt, the nickel complex of the azo dye obtained by coupling diazotized parachloraniline with 2,4-dihydroxyquinoline—Lithosol 3GD (U. S. P. 2,396,327: Claim 5). |
| (7) | Extra Fine Aluminum Flake (55% in Mineral Spirits) (Notes 1, 2). |
| (8) | Coarse Aluminum Flake (75% in Mineral Spirits) (Notes 1, 3). |
| (9) | Fine Aluminum Flake (65% in Mineral Spirits) (Note 1). |
| (10) | Medium Particle Size Channel Carbon Black. |
| (11) | Lamp Black. |
| (12) | Ferrite Yellow Orange. |
| (13) | Synthetic Red Iron Oxide. |
| (14) | 40% Ponsol Blue Lake. |
| (15) | Milori Blue (Ferric Ferrocyanide). |
| (16) | Precipitated Hydrous Iron Oxide (Water Wet) (Note 1) (U. S. P. 2,335,760). |
| (17) | Vat Thioindigoid Dyestuff—Indo Maroon. |

NOTE 1.—In all the enamel compositions of the examples, the percentage of pigment is on a pigment solids basis.

NOTE 2.—Pigment 7 can further be described as an "Extra Fine Aluminum Lining Paste (non-leafing)," in which substantially no flakes are as large as 20 microns in diameter and substantially all of the flakes are less than 10 microns in diameter.

NOTE 3.—Pigment 8 can further be described as a "Standard Aluminum Paste (leafing)," in which about 40% of the total surface area is composed of flakes with a diameter larger than 20 microns.

NOTE 4.—This pigment is a lake of dichloro-isodibenzanthrone on barium rosinate.

In Table 1 pigment 1 is a prime or transparent base pigment composed of iron oxide in chemical combination with water, an example of which is disclosed in U. S. Patent 2,384,579. Pigments 5 and 6 are prime pigments possessing qualities comparable to prime pigment 1 in durability, lightfastness, transparency, and tinting strength. Hence they are substantially equivalent to pigment #1 in the principle of this invention, but being different in hue and chroma, they produce different families of colors when substituted for pigment #1. Pigment 16 is similar to 1 but is prepared according to U. S. Patent 2,335,760. In the claims the term "hydrous iron oxide" is intended to refer to pigments substantially equivalent to those prepared according to either of the patents just mentioned above. Pigments 2, 3 and 4 are *transparent* tinting or toning pigments possessing high tinting strength, high chroma, lightfastness, and reasonably good outdoor durability.

Figure 3:
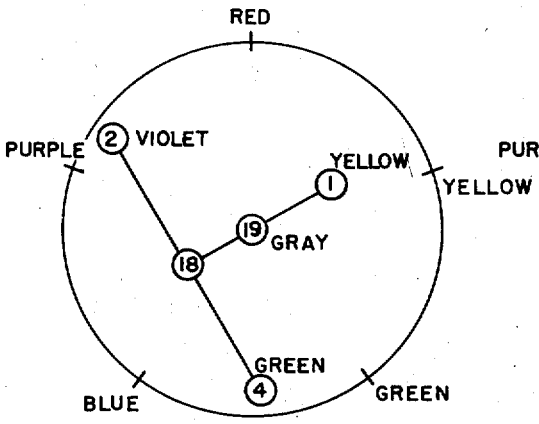

A durable transparent metallic neutral gray without black or white pigment will serve as a fundamental example of an automotive enamel of this invention. In this case it is desired to neutralize the hue and chroma of pigment 1, yet retain a preponderant proportion of pigment 1 in the finished enamel in order to utilize its transparency and durability to an optimum degree. Figure 3 is a graphical representation of the pigmentation. Since there is no known pigment completely complementary to pigment 1, proportions of 2 and 4 are blended to produce an intermediate hue 18, which is substantially complementary to 1. Then blend 18 and pigment 1 are blended in the proper proportions to produce 19, a neutral gray possessing substantially no hue or chroma. Pigment 3 might be substituted for pigment 4. A blend of 2 and 3, complementary to 1, would have a higher chroma than blend 18 and would require larger proportions of pigment 1 to produce a neutral gray. The enamel thus produced would possess greater transparency, less hiding power, and a different metallic effect than the same color gray enamel made with pigments 1, 2 and 4. In either case, a small amount of a flaked aluminum pigment is added. This lightens the color to the desired value and contributes to the metallic effect.

The final steps in producing a finished enamel are reduction to the desired pigment to binder ratio with additional vehicle, introduction of driers and other modifiers, and adjustment to the desired viscosity with suitable solvents.

Figure 4:
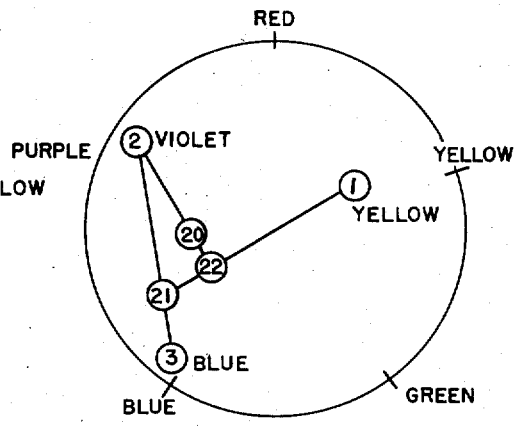

The method of this invention for pigmenting an enamel possessing hue and chroma, as contrasted with a neutral gray, is described as follows for a grayish blue metallic enamel. The desired hue and chroma were selected and are represented by the point 20 on Figure 4. To arrive at this hue and chroma, pigments 2 and 3 are blended in proportions yielding blend 21 which is complementary to pigment 1. Blend 21 and pigment 1 are mixed in proportions yielding blend 22 which is on an extension of a straight line connecting 2 and 20, so that by adding pigment 2 to blend 22 in small increments color 20 is approached and reached.

While the theory of producing a durable gray and a grayish blue metallic enamel have been explained above, the invention will be more completely understood from the examples listed in Table 2, in which the parts are by weight. The examples are largely shown in tabular form for convenience of comparison. The column or row headings are identified as follows:

Complementary Blend is blend of pigments to produce an improved metallic enamel of a desired color by this invention.

Conventional Blends I and II are alternative blends of conventional pigments commonly used in metallic enamels of the same color as the corresponding Complementary enamel. Two alternatives are given for comparative purposes. For instance, color #B Gray is substantially the same color in its three modifications, namely: Complementary, Conventional I, and Conventional II.

P/B is a designation for the ratio of total pigments to solid vehicle by weight. This refers to the final enamel produced, using the pigment blends in the table. Variations in P/B ratio occur because each pigment is dispersed (or ground) separately with small quantities of liquid vehicle to produce a mill base. For commercial production reasons, mill bases do not necessarily have the same P/B ratio.

The following formula represents a typical baking enamel vehicle for all of the tabulated pigmentations in which the parts are by weight:

| | |
|---|---|
| 49% linseed oil-China-wood oil glyceryl phthalate resin (solid) | 25.59 |
| 52% linseed oil glyceryl phthalate resin (solid) | 2.82 |
| 50% soya oil-China-wood oil pentaerythritol phthalate resin (solid) | 6.88 |
| 33% China-wood oil phenolformaldehyde varnish (solid) | 0.41 |
| Drier solution (3% manganese) | 0.45 |
| Urea-formaldehyde-butanol resin (solid) | 1.03 |
| Butanol | 0.69 |
| Hydrocarbon solvent (volatile) | 62.13 |
| | 100.00 |

The thinner or solvent content of the final enamel is variable because it is common practice to prepare enamels at a uniform viscosity rather than at a constant percent of volatile solvent. Therefore, variations occur from color to color and ofter even between different batches of the same enamel. The viscosity of the baking enamels was 37 seconds ±4 seconds in a Parlin #10 viscosity cup at 25° C. A suitable baking schedule for these products applied to metal substrates was 1 hour at 225° F.

The following formula is a typical air drying vehicle for illustrating all of the tabulated pigmentations in which the parts are by weight:

| | |
|---|---|
| 49% linseed oil-China-wood oil glyceryl phthalate resin (solid) | 25.59 |
| 52% linseed oil-glyceryl phthalate resin (solid) | 2.82 |
| 50% soya oil-China-wood oil pentaerythritol phthalate resin (solid) | 6.88 |
| 33% China-wood oil phenolformaldehyde varnish (solid) | 0.41 |
| Drier solution (16% lead) | 0.63 |
| Drier solution (3% manganese) | 0.46 |
| Drier solution (2% cobalt) | 0.91 |
| Hydrocarbon solvent (volatile) | 62.25 |
| | 100.00 |

The final volatile solvent content varied as described under the baking vehicle. The viscosity of the air drying enamels was the same as for the baking enamels.

An example of a finished synthetic resin enamel typical of those intended in this invention, using the above air drying vehicle as a basis, is as follows. The parts are by weight. The pigmentation is taken from Complementary Color A, Gray, of Table 2:

| | |
|---|---|
| Pigment 3, Blue | 0.454 |
| Pigment 2, Violet | 0.247 |
| Pigment 1, Yellow | 2.167 |
| Pigment 7, Aluminum | 1.228 |
| 49% linseed oil-China-wood oil glyceryl phthalate resin | 24.527 |
| 52% linseed oil glyceryl phthalate resin | 2.701 |
| 50% soya oil-China-wood oil pentaerythritol phthalate resin | 6.599 |
| 33% China-wood oil phenolformaldehyde varnish (solid) | 0.392 |
| Drier solution (16% lead) | 0.654 |
| Drier solution (3% manganese) | 0.436 |
| Drier solution (2% cobalt) | 0.872 |
| Hydrocarbon solvent (volatile) | 59.723 |
| | 100.000 |

In all of the 8 basic colors of Table 2 (A–H), the Complementary modification possessed better application properties, metallic appearance, or outdoor durability, than the two corresponding Conventional enamels. In substantially all instances, the Complementary modification was

TABLE 2

| Matched Color | METALLIC ENAMEL COMPOSITIONS | | | | | | | | | | | |
|---|---|---|---|---|---|---|---|---|---|---|---|---|
| | Complementary Blend | | | | Conventional Blend I | | | | Conventional Blend II | | | |
| | P/B Ratio | Pigment | | | P/B Ratio | Pigment | | | P/B Ratio | Pigment | | |
| | | No. | Color | Percent | | No. | Color | Percent | | No. | Color | Percent |
| (A) Gray | 9.2/100 | (3) | Blue | 11 | 8.7/100 | (11) | Black | 30 | 9.9/100 | (10) | Black | 13 |
| | | (2) | Violet | 6 | | (14) | Blue | 30 | | (3) | Blue | 11 |
| | | (1) | Yellow | 53 | | | | | | (13) | Red | 8 |
| | | (7) | Aluminum | 30 | | (7) | Aluminum | 40 | | (7) | Aluminum | 68 |
| | | | | 100 | | | | 100 | | | | 100 |
| (B) Gray | 9.3/100 | (4) | Green | 11 | 10.2/100 | (10) | Black | 18 | 9.0/100 | (10) | Black | 25 |
| | | (2) | Violet | 8 | | (13) | Red | 3 | | (13) | Red | [1] Tr |
| | | (1) | Yellow | 51 | | (1) | Yellow | 15 | | (12) | Yellow | [1] Tr |
| | | (7) | Aluminum | 30 | | (7) | Aluminum | 64 | | (7) | Aluminum | 75 |
| | | | | 100 | | | | 100 | | | | 100 |
| (C) Green-Gray | 9.4/100 | (3) | Blue | 16 | 9.6/100 | (3) | Blue | 17 | 11.6/100 | (4) | Green | 37 |
| | | (2) | Violet | 4 | | (11) | Black | 10 | | (10) | Black | 12 |
| | | (6) | Yellow | 50 | | (6) | Yellow | 41 | | (12) | Yellow | 15 |
| | | (9) | Aluminum | 30 | | (9) | Aluminum | 32 | | (9) | Aluminum | 36 |
| | | | | 100 | | | | 100 | | | | 100 |
| (D) Blue-Gray | 8.2/100 | (3) | Blue | 30 | 8.9/100 | (3) | Blue | 36 | 9.6/100 | (14) | Blue | 61 |
| | | (2) | Violet | 15 | | [(1)] (2) | Violet | 8 | | | | |
| | | (6) | Yellow | 25 | | (10) | Black | 12 | | (11) | Black | 8 |
| | | (9) | Aluminum | 30 | | (9) | Aluminum | 44 | | (9) | Aluminum | 31 |
| | | | | 100 | | | | 100 | | | | 100 |
| (E) Gray | 8.4/100 | (3) | Blue | 11 | 8.0/100 | (11) | Black | 50 | 8.8/100 | (10) | Black | 32 |
| | | (2) | Violet | 13 | | | | | | | | |
| | | (6) | Yellow | 46 | | (6) | Yellow | 8 | | (3) | Blue | 5 |
| | | (9) | Aluminum | 30 | | (9) | Aluminum | 42 | | (9) | Aluminum | 63 |
| | | | | 100 | | | | 100 | | | | 100 |
| (F) Brown | 8.8/100 | (3) | Blue | 2 | 8.8/100 | [(1)] (11) | Black | 4 | 14.8/100 | (10) | Black | 5 |
| | | (2) | Violet | 9 | | (2) | Violet | 8 | | (13) | Red | 16 |
| | | (6) | Yellow | 59 | | (6) | Yellow | 57 | | (12) | Yellow | 54 |
| | | (9) | Aluminum | 30 | | (9) | Aluminum | 31 | | (9) | Aluminum | 25 |
| | | | | 100 | | | | 100 | | | | 100 |
| (G) Gray | 15.3/100 | (5) | Green | 61 | 8.7/100 | (11) | Black | 22 | 9.4/100 | (10) | Black | 17 |
| | | (2) | Violet | 2 | | (2) | Violet | 2 | | (13) | Red | 2 |
| | | [(3) | Blue] (1) *Yellow* | 14 | | (1) | Yellow | 16 | | | | |
| | | (8) | Aluminum | 23 | | (8) | Aluminum | 60 | | (8) | Aluminum | 81 |
| | | | | 100 | | | | 100 | | | | 100 |
| (H) Blue | 12.3/100 | (5) | Green | 55 | 10.0/100 | (14) | Blue | 88 | 9.8/100 | (15) | Blue | 65 |
| | | (2) | Violet | 10 | | | | | | (2) | Violet | 11 |
| | | (3) | Blue | 20 | | | | | | (11) | Black | 1 |
| | | (8) | Aluminum | 15 | | (8) | Aluminum | 12 | | (8) | Aluminum | 23 |
| | | | | 100 | | | | 100 | | | | 100 |

[1] Trace.

superior in every respect. In the Complementary enamels no black or white pigments were used, the aluminum pigment content was lower, with one exception, and the pigment content was predominantly pigments 1, 5 or 6 or a combination thereof, so that the resulting enamels were superior in application properties, durability and metallic appearance.

TABLE 3

| Matched Color | Complementary Blend Nitrocellulose Lacquer | | | | Complementary Blend Synthetic Resin Enamel | | | |
|---|---|---|---|---|---|---|---|---|
| | P/B Ratio | Pigment | | | P/B Ratio | Pigment | | |
| | | No. | Color | Percent | | No. | Color | Percent |
| (J) Brown | 8.75/100 | (16) | Yellow | 51.3 | 12.5/100 | (1) | Yellow | 74.0 |
| | | (17) | Maroon | 6.9 | | (2) | Violet | 4.0 |
| | | (4) | Green | 5.4 | | (3) | Blue | 4.0 |
| | | (8) | Aluminum | 36.4 | | (8) | Aluminum | 18.0 |
| | | | | 100.0 | | | | 100.0 |
| (K) Brown | 9.35/100 | (16) | Yellow | 80.3 | 15.4/100 | (1) | Yellow | 85.7 |
| | | (17) | Maroon | 10.4 | | (3) | Blue | 6.1 |
| | | (3) | Blue | 4.8 | | (2) | Violet | 5.1 |
| | | (8) | Aluminum | 4.5 | | (8) | Aluminum | 3.1 |
| | | | | 100.0 | | | | 100.0 |
| (L) Gray | 11.3/100 | (5) | Green | 68.9 | | | | |
| | | (16) | Yellow | 11.1 | | | | |
| | | (17) | Maroon | 4.2 | | | | |
| | | (3) | Blue | 1.4 | | | | |
| | | (8) | Aluminum | 14.4 | | | | |
| | | | | 100.0 | | | | |
| (M) Gray | 8.55/100 | (16) | Yellow | 50.2 | | | | |
| | | (4) | Green | 12.4 | | | | |
| | | (3) | Blue | 12.7 | | | | |
| | | (17) | Maroon | 19.5 | | | | |
| | | (8) | Aluminum | 5.2 | | | | |
| | | | | 100.0 | | | | |
| (N) [Dark Gray] *Gray Green* | 11.3/100 | (5) | Green | 65.9 | | | | |
| | | (16) | Yellow | 18.3 | | | | |
| | | (17) | Maroon | 3.6 | | | | |
| | | (4) | Green | 1.1 | | | | |
| | | (8) | Aluminum | 11.1 | | | | |
| | | | | 100.0 | | | | |
| (O) Green | 9.1/100 | (16) | Yellow | 81.4 | | | | |
| | | (3) | Blue | 10.5 | | | | |
| | | (17) | Maroon | 3.5 | | | | |
| | | (8) | Aluminum | 4.6 | | | | |
| | | | | 100.0 | | | | |

The following are examples of the application of this invention to nitrocellulose or lacquer-type compositions. For direct comparison, the pigmentation of synthetic resin enamels of substantially the same color as the first two lacquers is shown. In all compositions black and white pigments are absent, and the pigment combinations are based on the principles of this invention. It is to be understood that in the lacquers, as in the synthetic resin enamels, all pigments had been previously dispersed in a suitable vehicle (usually nitrocellulose for the lacquers) by methods known to the art.

In Table 3, the Synthetic Resin Enamels may be made with either a baking or an air dry vehicle.

A suitable vehicle for the lacquers in Table 3 has the following analysis, by weight:

| | Per cent |
|---|---|
| Cellulose nitrate | 17.6 |
| 50% cocoanut oil glyceryl phthalate resin | 8.8 |
| Dibutyl phthalate | 3.6 |
| Blown castor oil | 2.5 |
| Butyl acetate | 24.3 |
| Methyl ethyl ketone | 10.8 |
| Methyl isobutyl carbinol | 5.4 |
| Toluene | 5.1 |
| Xylene | 5.0 |
| Ethyl alcohol | 13.5 |
| High solvency naphtha | 3.4 |
| | 100.0 |

The cellulose nitrate in this composition is the conventional lacquer type, having a viscosity of about 6 seconds in Formula C of A. S. T. M. D-301-33.

Brown Lacquer J of Table [2] 3, using this vehicle had the following composition, by weight:

| | Per cent |
|---|---|
| Pigment 16, Yellow | 1.4 |
| Pigment 4, Green | 0.2 |
| Pigment 17, Maroon | 0.2 |
| Pigment 8, Aluminum | 1.0 |
| Cellulose nitrate | 17.1 |
| 50% cocoanut oil glyceryl phthalate resin | 8.6 |
| Dibutyl phthalate | 3.5 |
| Blown castor oil | 2.4 |
| Butyl acetate | 23.6 |
| Methyl ethyl ketone | 10.5 |
| Methyl isobutyl carbinol | 5.3 |
| Toluene | 4.9 |
| Xylene | 4.9 |
| Ethyl alcohol | 9.8 |
| High solvency naphtha | 6.6 |
| | 100.0 |

In the claims the term "preponderant" as applied to the transparent prime pigment means that it is present in amount greater than any other single pigment. The term "transparent pigment" refers to a pigment which when dispersed in an organic vehicle has low hiding power and transparency as distinguished from a relatively opaque pigment with relatively high hiding power. In the former case the transparency of the pigment allows the light to reach the aluminum particles giving the film a high metallic brilliance whereas an opaque pigment would mask the reflection giving a dull, lifeless film.

The aluminum powders used in the compositions of the present invention are widely available commercially in the form of mineral spirit pastes. They are made in leafing and non-leafing grades and also in fine grades called "lining" pastes or coarser grades called "standard" pastes. Any grade may be used, but the "standard" grade which is considerably coarser than the "linings" grade imparts a much greater brilliance to enamel films giving them an unusual apparent depth. For this reason the "standard" grade of aluminum paste is preferred in both cellulose derivative and synthetic resin enamels of this invention where a maximum degree of reflection is desired.

The proportions of pigments may vary to give a large assortment of colors and effects; but in the preferred embodiment of the invention, the prime transparent pigment (A) of the claims may vary between 25% and 85.7% by weight of the total pigment in synthetic resin enamels and between 11% and 84% for cellulose derivative lacquers.

The relatively transparent complementary pigments (B) and tinting pigment (C) of the claims may vary in the preferred embodiment from 11% to 45% combined in synthetic resin enamels and from 4.7% to 44.6% in cellulose derivative enamels.

The aluminum powder (D) of the claims may vary from 3.1% to 30% in synthetic resin enamels and from 4.5% to 36.4% in cellulose derivative lacquers.

The principles of pigmentation for coating compositions with a metallic appearance disclosed in this invention are applicable to all types of film-forming materials including, (1) all types of alkyd resins made from any combination of a polyhydric alcohol and a polybasic acid, unmodified or modified with non-drying oils, semi-drying oils, or drying oils such as coconut oil, soya oil, and linseed oil, respectively; (2) cellulose derivative film-forming agents; (3) vinyl type materials such as vinyl, acrylic, and allyl resins; (4) urea-formaldehyde type resins; (5) melamine formaldehyde resins; (6) phenol formaldehyde resins and oleoresinous compositions prepared therefrom; and (7) miscellaneous film-forming materials such as silicone resins.

The principles of pigmentation of this invention pertain also to durable, lightfast, transparent, low tinting strength, low hiding pigments other than the prime pigments which are shown as examples of the type most useful, namely, the hydrous iron oxides #1 and #16, the yellow #6, and the green #5, which contribute predominantly to the transparency and outdoor durability of the products. [Tinting] *Transparent tinting* and toning pigments other than violet #2, blue #3, green #4 and maroon #17 will be found useful in the practice of this invention; and those listed are used to set forth the invention without limiting its scope.

Aluminum flake pigments 7 (extra fine), 8 (coarse) and 9 (fine) listed in Table 1 each contribute to a different degree to the metallic appearance of a finished enamel. Pigment 8 (coarse) is preferred where the most brilliant metallic appearance is required. Pigment 9 (fine) gives a less brillant effect and #7 yields the least brilliance of the three listed, although even enamels prepared from the latter are attractive and useful products.

It is obvious to one skilled in the art that useful coating compositions can be made within the scope of this invention using other prime or transparent base pigments, other tinting pigments, and other grades of aluminum pastes, resulting in the improvements set forth previously, although those used in this disclosure are currently preferred because the resulting colors are at present the most popular where metallic enamels are largely used—automobiles and certain other commercial articles.

The advantages of the enamels of this invention over conventional metallic coating compositions are depth, high-lighting of colors, apparent color change when viewed from different directions or under different light, and polychromatic appearance; and, in addition to these, a marked improvement in outdoor durability over conventional metallic enamels in gloss retention, color retention, and general film integrity, including freedom from bronzing, chalking, checking, and cracking. The application properties and resistance to aluminum mottling of the metallic enamels of this invention are equal to, or better than, the duller and less brilliant conventional metallic enamels and are far superior to conventional products which have had large quantities of aluminum flakes added to enhance the metallic effect.

It is apparent that many widely different embodiments of this invention may be made without departing from the spirit and scope thereof, and therefore, it is not intended to be limited except as indicated in the appended claims.

This application is a division of my copending application, Serial No. 51,883, now Patent 2,604,-414.

I claim:

1. A coating composition adapted to yield a tough. durable finish having a metallic appearance of great depth and brilliance, comprising a vehicle and pigment, said pigment consisting of (A) the nickel complex of the azo dye obtained by coupling diazotized parachloraniline with 2,4-dihydroxyquinoline; (B) *transparent* pigment substantially complementary in color to the said (A) pigment in amount to yield a gray when mixed separately therewith; (C) at least one colored tinting pigment and (D) finely divided flake aluminum metal.

2. The composition of claim 1 in which the aluminum flake is relatively coarse and about 40% of the total aluminum surface area is composed of flakes with a diameter larger than 20 microns.

3. The composition of claim 1 in which the pigment (A) is present in amount between 11% and 85.7% by weight of the total pigment; complementary pigment (B) and tinting pigment (C) combined are present in amount between 4.7% and 45%; and aluminum flake powder (D) is present in amount between 3.1% and 36.4%.

4. The composition of claim 1 in which the vehicle contains a synthetic resin and the pigments are present in amount as follows:

(A) 25% to 85.7% by weight
(B) and (C) 11% to 45%
(D) 3.1% to 30%

5. The composition of claim 1 in which the vehicle is a nitrocellulose lacquer and the pigments are present in amount as follows:

(A) 11% to 84% by weight
(B) and (C) 4.7% to 44.6%
(D) 4.5% to 36.4%

6. The composition of claim 1 in which the pigment (B) is composed of a plurality of pigments, the resulting shade of which is substantially complementary to pigment (A).

7. The composition of claim 1 in which the pigment (B) is composed of a plurality of pigments, one of which is in excess of the amount necessary to produce a color complementary to pigment (A), the said excess being pigment (C).

8. A process of preparing coating compositions adapted to produce tough, durable finishes having a metallic appearance of great depth and brilliance, which comprises blending (A) a relatively transparent pigmented composition, the pigment portion of which consists essentially of the nickel complex of the azo dye obtained by coupling diazotized parachloraniline with 2,4-dihydroxyquinoline; with (B) a *transparent* pigmented composition in which the pigment is substantially complementary in color to the pigment of (A); tinting the resulting blend with (C) a colored, pigmented composition and adding (D) flake aluminum metal.

9. The process of claim 8 in which the aluminum flake is relatively coarse and about 40% of the total aluminum surface area is composed of flakes with a diameter larger than 20 microns.

10. The composition of claim 1 in which the pigment (B) is a lake of dichloroisodibenzanthrone on barium rosinate.

11. The composition of claim 1 in which the pigment (B) comprises phthalocyanine blue.

12. The composition of claim 1 in which the pigment (B) comprises phthalocyanine green.

13. The composition of claim 1 in which the pigment (B) is vat thioindigoid dyestuff-indo maroon.

14. The process of claim 8 in which the pigment (B) is a lake of dichloroisodibenzanthrone on barium rosinate.

15. The process of claim 8 in which the pigment (B) comprises phthalocyanine blue.

16. The process of claim 8 in which the pigment (B) comprises phthalocyanine green.

17. The process of claim 8 in which the pigment (B) is vat thioindigoid dyestuff-indo maroon.

RALPH E. PIKE.

No references cited.